US012600111B2

(12) United States Patent 
Kang

(10) Patent No.: US 12,600,111 B2 
(45) Date of Patent: Apr. 14, 2026

(54) ELASTIC MEMBER AND DISPLAY DEVICE COMPRISING SAME

(71) Applicant: LG INNOTEK CO., LTD., Seoul (KR)

(72) Inventor: Sung Won Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 271 days.

(21) Appl. No.: 18/038,906

(22) PCT Filed: Aug. 16, 2022

(86) PCT No.: PCT/KR2022/012212 
§ 371 (c)(1), 
(2) Date: May 25, 2023

(87) PCT Pub. No.: WO2023/033411 
PCT Pub. Date: Mar. 9, 2023

(65) Prior Publication Data 
US 2024/0017526 A1     Jan. 18, 2024

(30) Foreign Application Priority Data

Sep. 6, 2021     (KR) ........................ 10-2021-0118680

(51) Int. Cl. 
B32B 15/14          (2006.01) 
B32B 9/00          (2006.01) 
(Continued)

(52) U.S. Cl. 
CPC .............. B32B 15/14 (2013.01); B32B 9/007 (2013.01); B32B 9/041 (2013.01); B32B 17/02 (2013.01); 
(Continued)

(58) Field of Classification Search 
CPC ......... B32B 15/14; B32B 9/007; B32B 9/041; B32B 17/02; B32B 37/1284; 
(Continued)

(56) References Cited

U.S. PATENT DOCUMENTS 9,639,121 B2     5/2017  Min et al. 
10,452,171 B2   10/2019  Jung et al. 
(Continued)

FOREIGN PATENT DOCUMENTS

CN          104346999          2/2015 
CN          111542941          8/2020 
(Continued)

OTHER PUBLICATIONS

Japanese Office Action dated Apr. 30, 2024 issued in Application No. 2023-534339. 
(Continued)

*Primary Examiner* — Matthew D Matzek 
(74) *Attorney, Agent, or Firm* — KED & ASSOCIATES, LLP

(57)          ABSTRACT

An elastic member according to an embodiment includes: a first region and a second region, wherein a first direction is defined as a width direction of the elastic member and a second direction defined as a longitudinal direction of the elastic member, wherein the first region is defined as a folding region that is folded with the first direction as a folding axis, and the second region is defined as an unfolding region, wherein the elastic member includes a first layer and a second layer on the first layer; wherein the second layer includes a base material and fibers disposed inside the base material, wherein the fibers are disposed while extending in the second direction.

16 Claims, 15 Drawing Sheets

(51) Int. Cl.
    *B32B 9/04* (2006.01)
    *B32B 17/02* (2006.01)
    *B32B 37/12* (2006.01)
(52) U.S. Cl.
    CPC .... *B32B 37/1284* (2013.01); *B32B 2457/208* (2013.01)
(58) Field of Classification Search
    CPC ........ B32B 2457/208; B32B 2260/021; B32B 2260/046; B32B 2262/101; B32B 2262/105; B32B 2262/106; B32B 2307/732; B32B 2307/7376; B32B 2457/20; B32B 7/022; B32B 7/12; B32B 27/20; C08J 5/04; G06F 3/041; G06F 3/0412; G09F 9/30; G09F 9/301; H10K 50/84
    USPC ...................................................... 428/292.1
    See application file for complete search history.

(56) References Cited

U.S. PATENT DOCUMENTS

| | | | |
|---|---|---|---|
| 10,831,293 B2 | 11/2020 | Jung et al. | |
| 11,631,828 B2 | 4/2023 | Baby et al. | |
| 11,841,746 B2 | 12/2023 | Kang et al. | |
| 12,228,972 B2 | 2/2025 | Kang et al. | |
| 2013/0265262 A1 | 10/2013 | Jung et al. | |
| 2014/0329048 A1 | 11/2014 | Jung et al. | |
| 2015/0029652 A1* | 1/2015 | Min | H05K 1/0278 361/679.27 |
| 2015/0314326 A1 | 11/2015 | Park et al. | |
| 2019/0391680 A1 | 12/2019 | Jung et al. | |
| 2020/0171784 A1 | 6/2020 | Hamburgen | |
| 2020/0287156 A1* | 9/2020 | Baby | H10K 59/871 |
| 2022/0243096 A1 | 8/2022 | Kim et al. | |
| 2023/0017674 A1* | 1/2023 | Kim | G06F 1/1652 |

FOREIGN PATENT DOCUMENTS

| | | |
|---|---|---|
| JP | 2013-218695 | 10/2013 |
| JP | 2015-026055 | 2/2015 |
| JP | 2020-537185 | 12/2020 |
| KR | 10-2014-0077584 | 6/2014 |
| KR | 10-1402743 | 6/2014 |
| KR | 10-2015-0014562 | 2/2015 |
| KR | 10-1669317 | 10/2016 |
| KR | 10-2020-0053946 | 5/2020 |
| KR | 10-2020-0060511 | 5/2020 |
| KR | 10-2195384 | 12/2020 |
| KR | 10-2021-0019839 | 2/2021 |
| KR | 10-2021-0043029 | 4/2021 |
| WO | WO 2019/074932 | 4/2019 |
| WO | WO 2021/002495 | 1/2021 |
| WO | WO 2021/137480 | 7/2021 |

OTHER PUBLICATIONS

International Search Report dated Dec. 12, 2022 issued in Application No. PCT/KR2022/012212.
Extended European Search Report dated Jul. 18, 2025, issued in Application No. 22864915.8.

* cited by examiner

【FIG. 1】
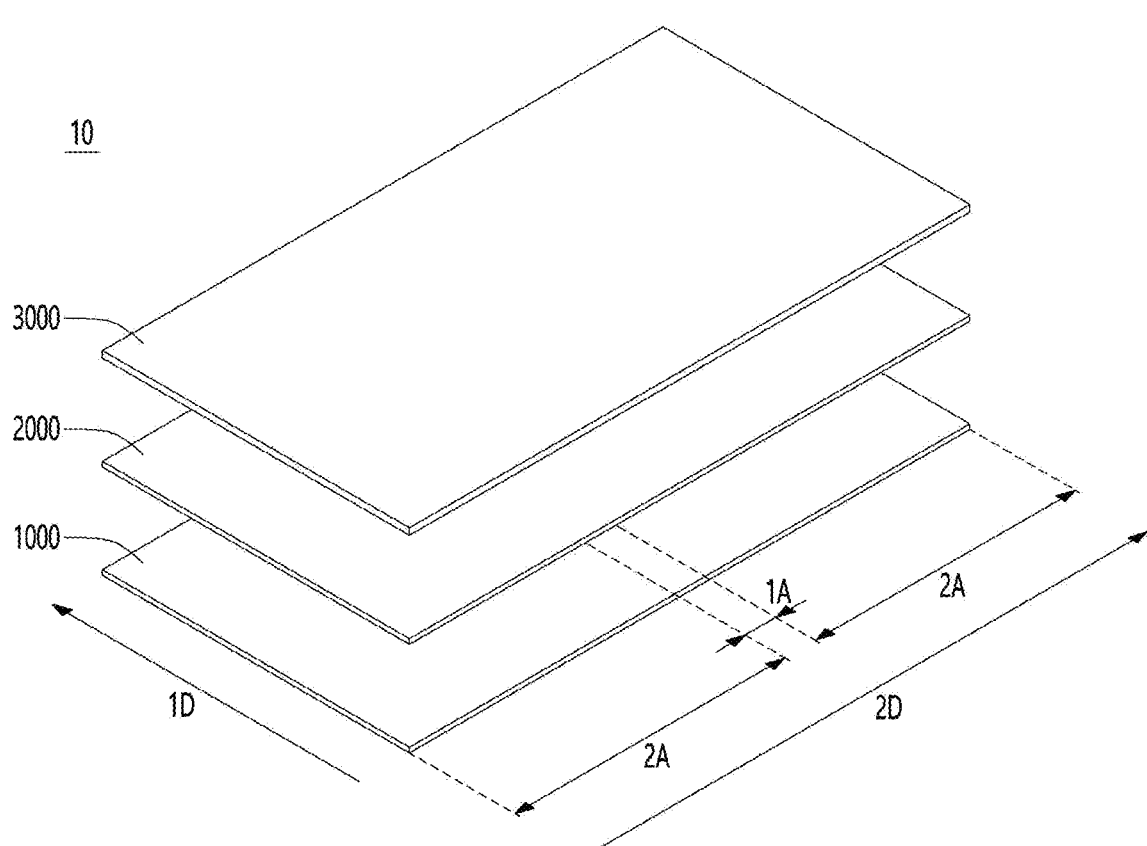

【FIG. 2】
1000
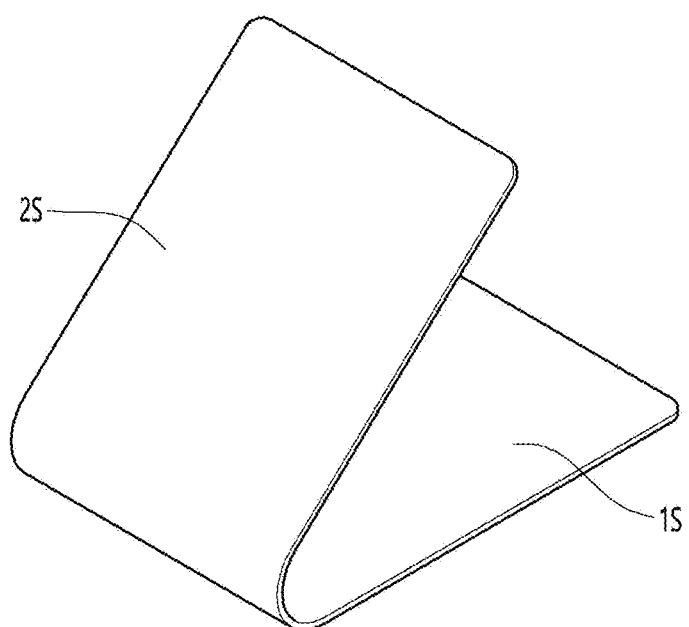
【FIG. 3】
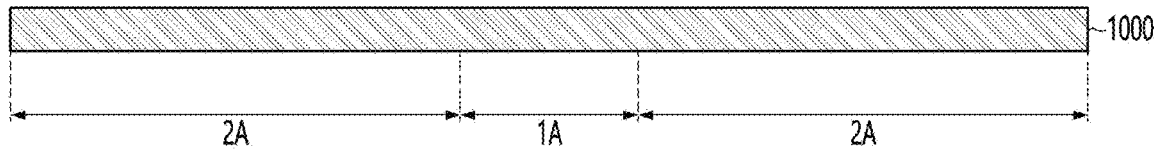

【FIG. 4】
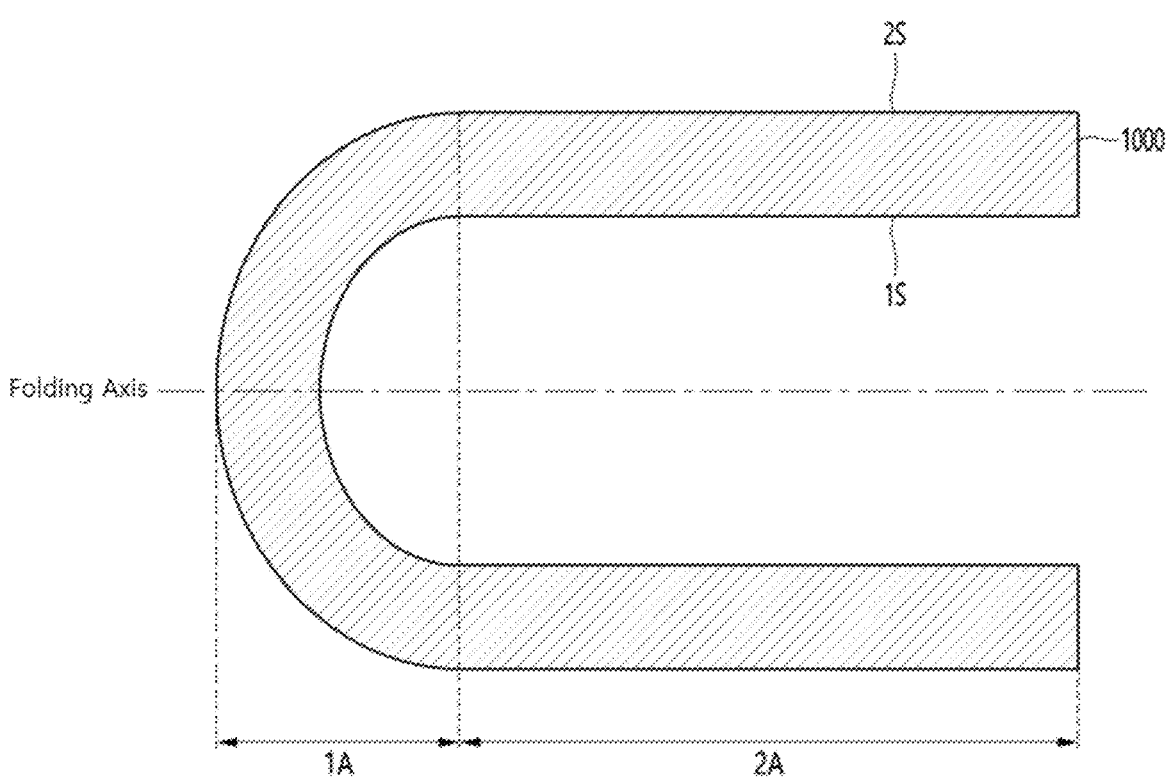
【FIG. 5】
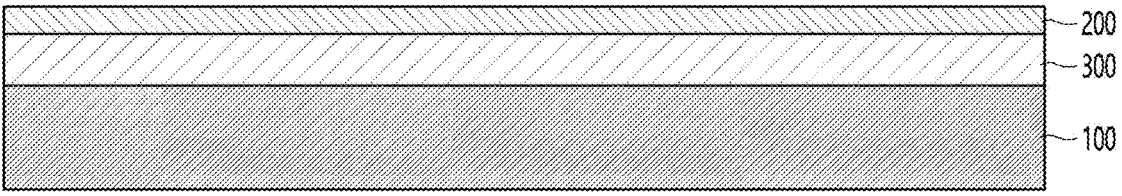

【FIG. 6】
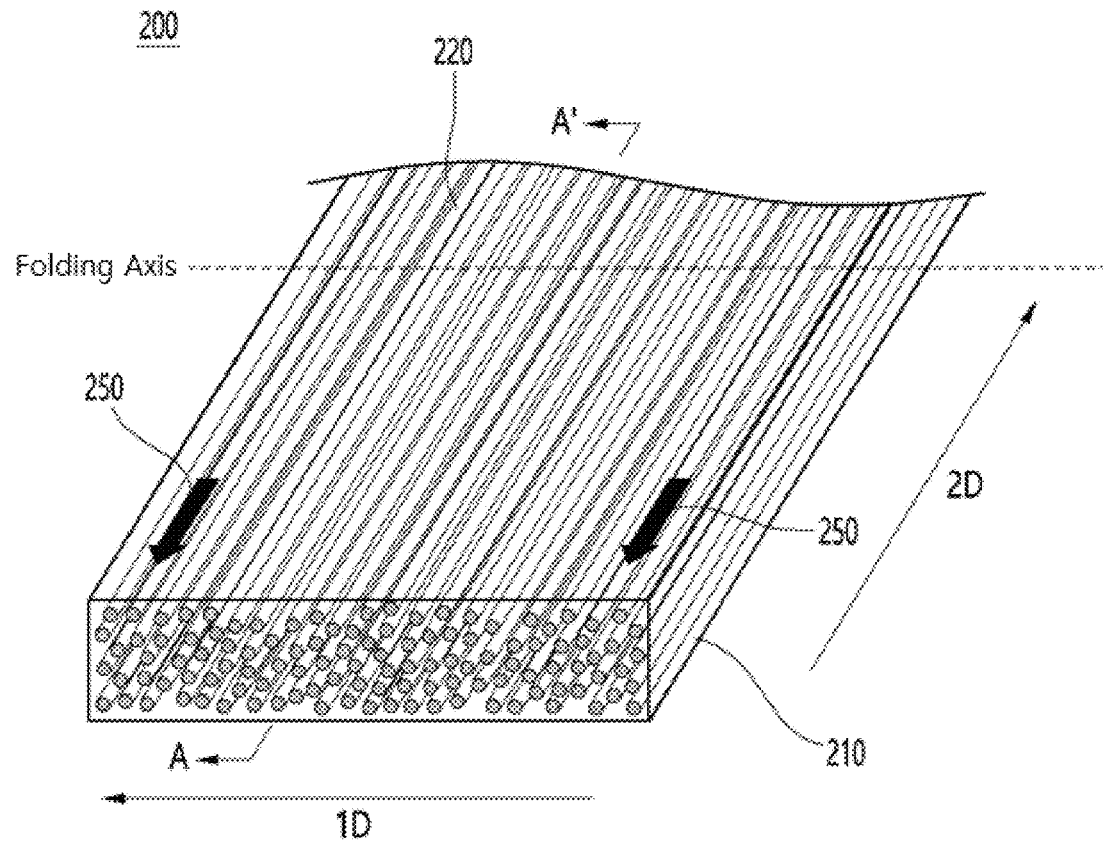
【FIG. 7】
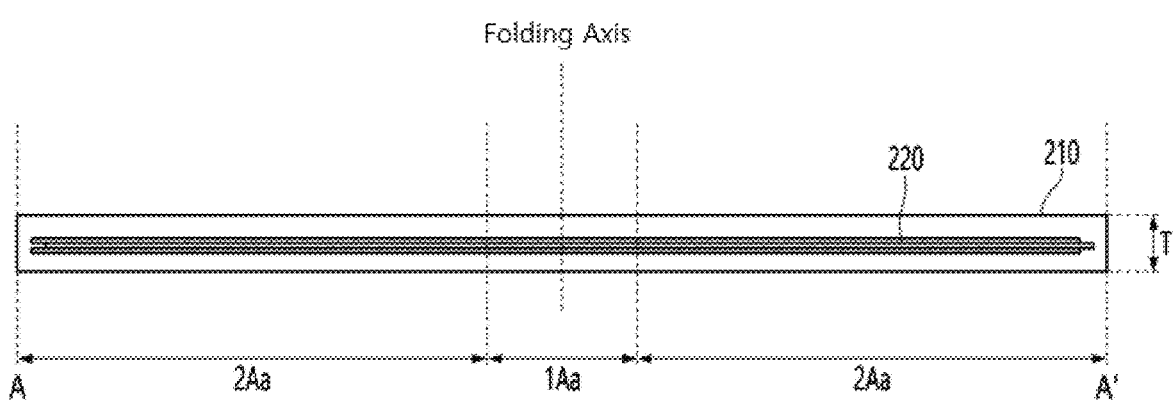

【FIG. 8】
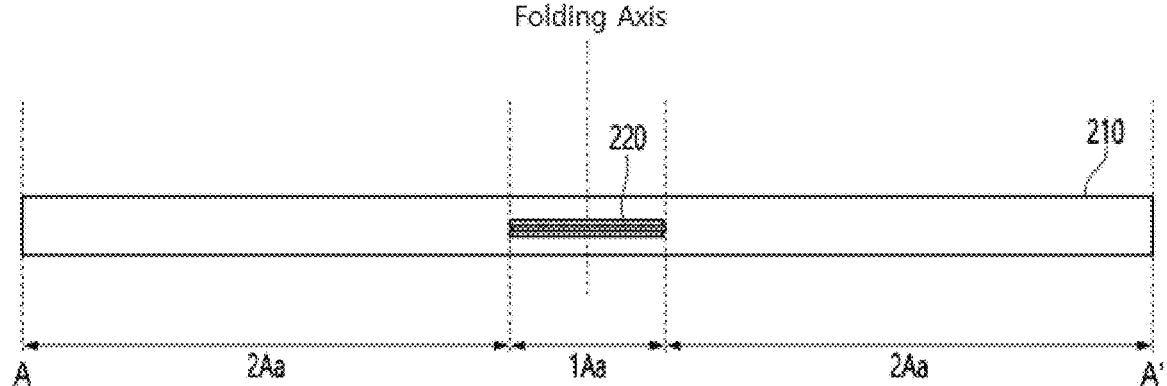
【FIG. 9】
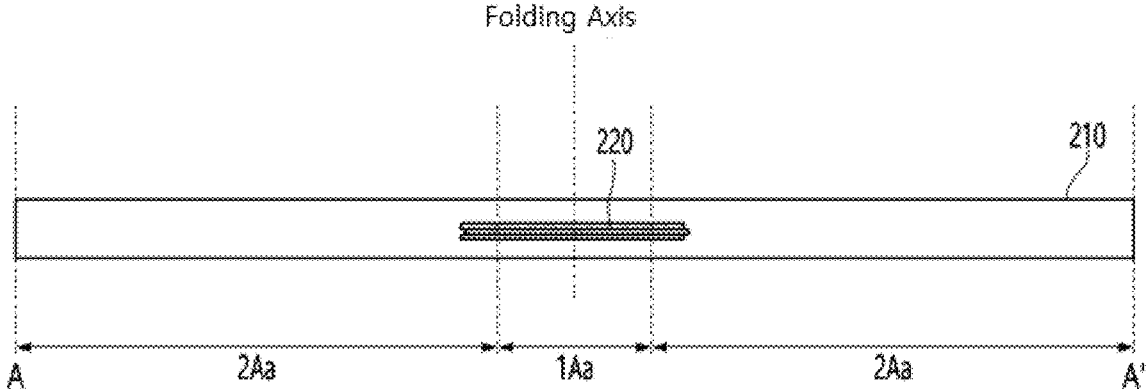
【FIG. 10】
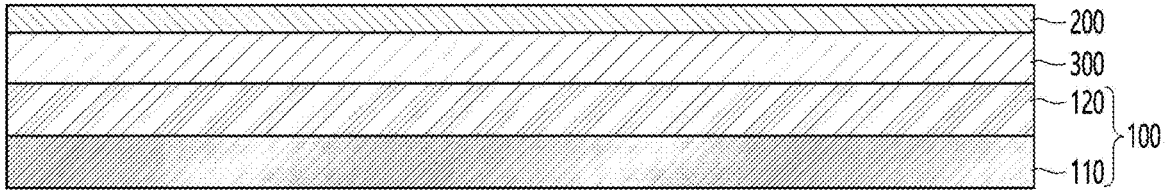

【FIG. 11】
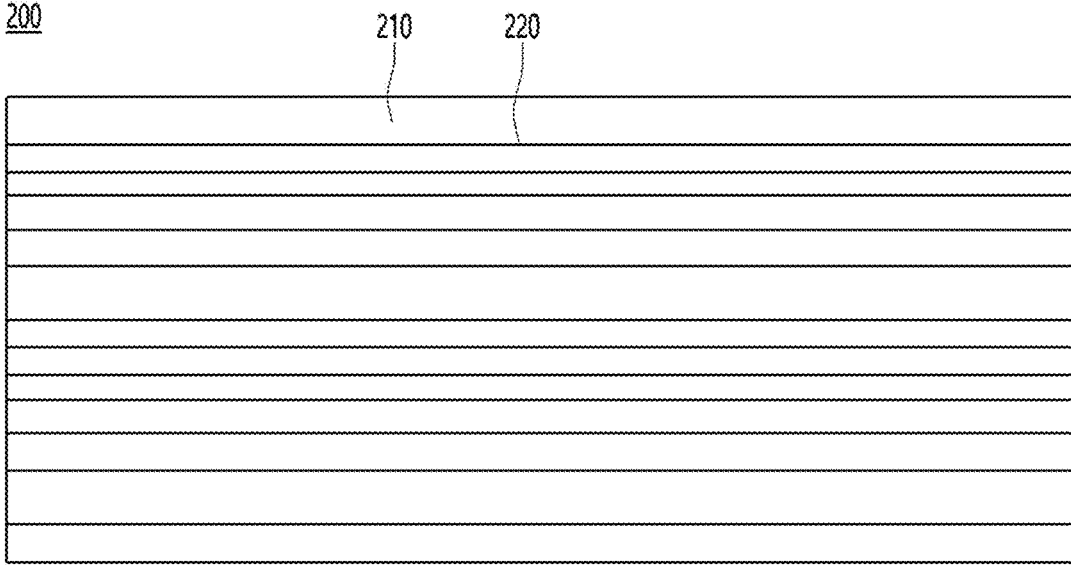
【FIG. 12】
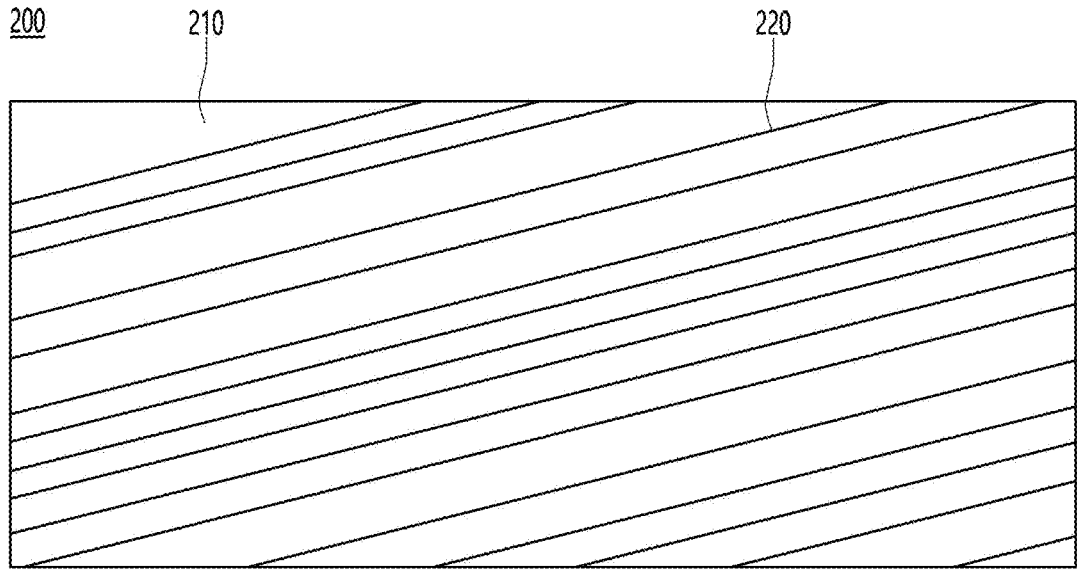

【FIG. 13】
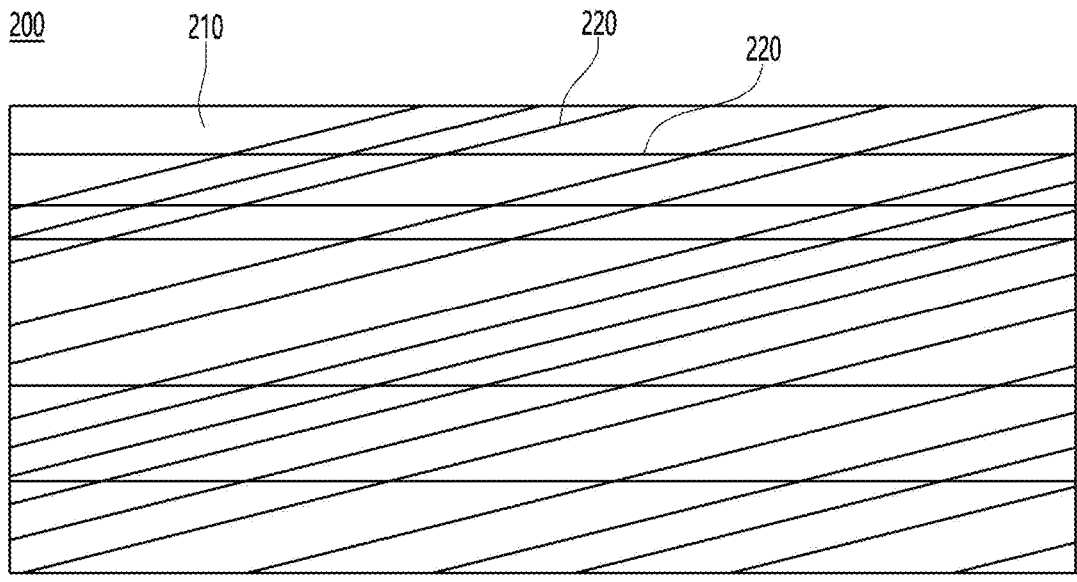
【FIG. 14】
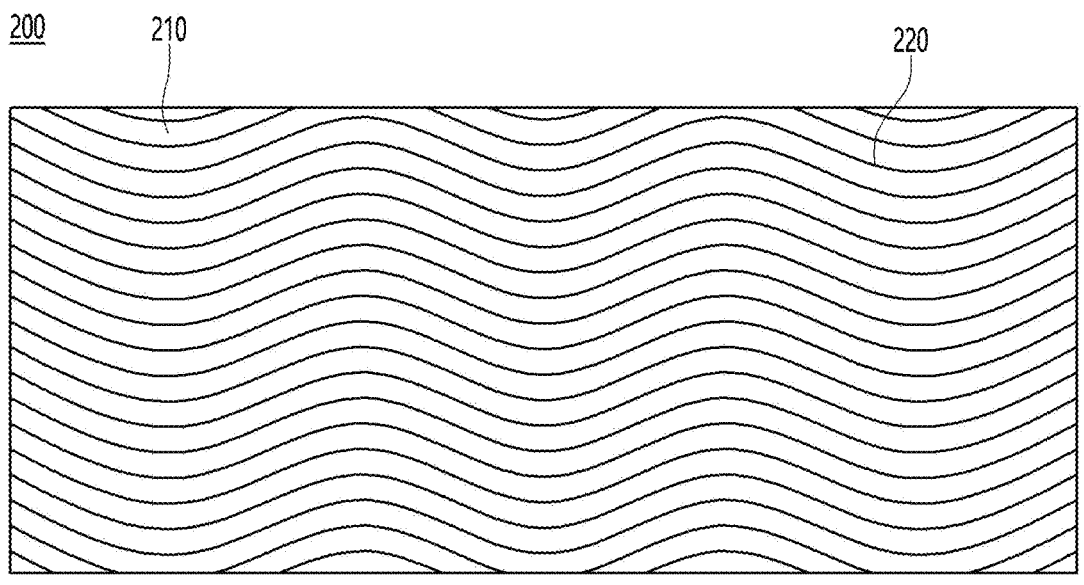

【FIG. 15】
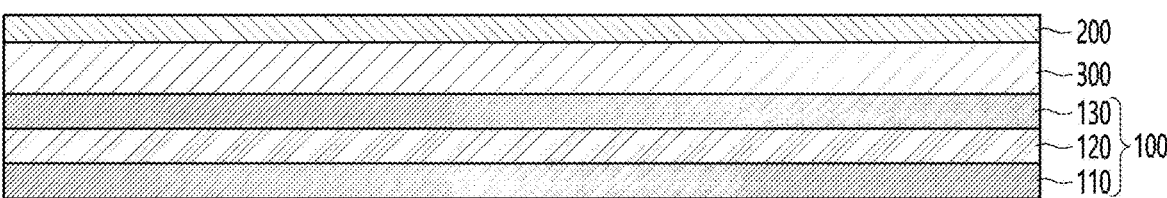
【FIG. 16】
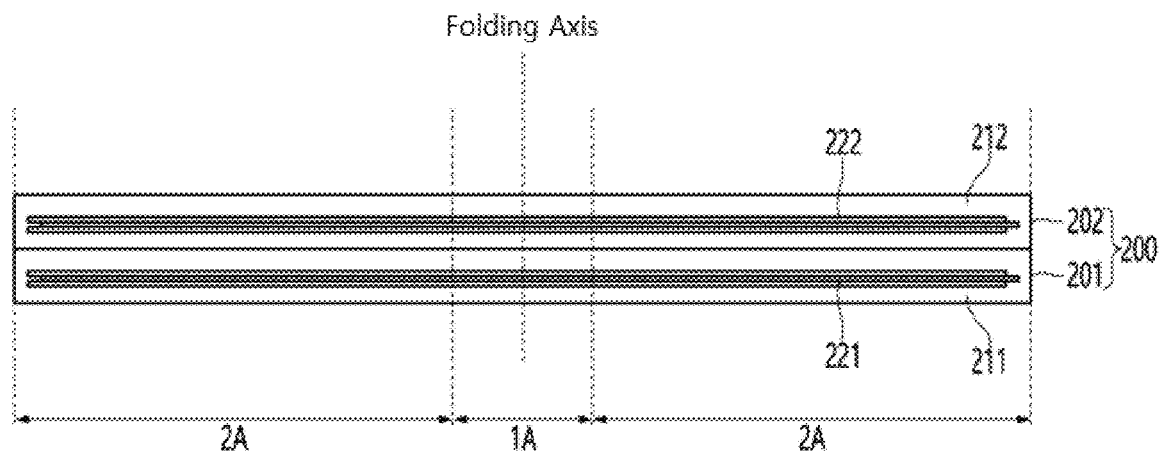
【FIG. 17】
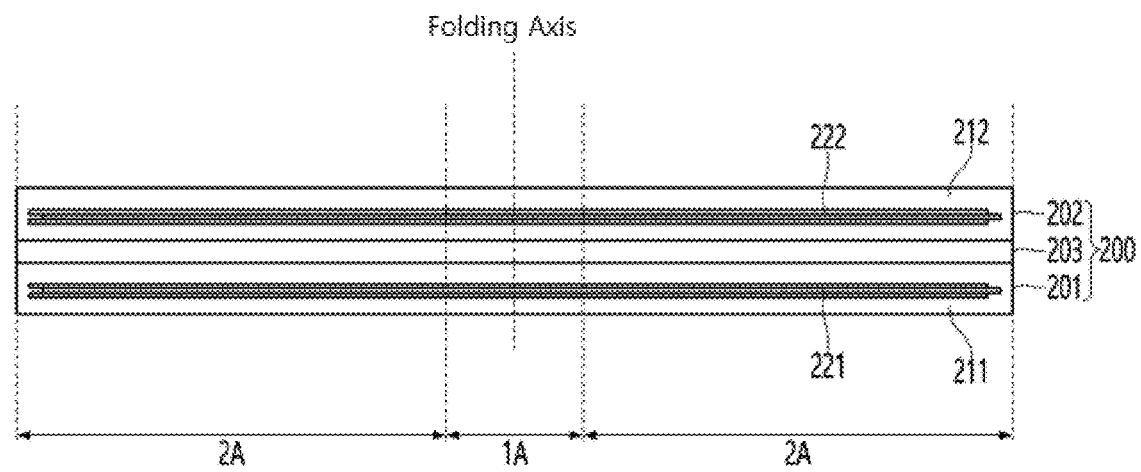

[FIG. 18]
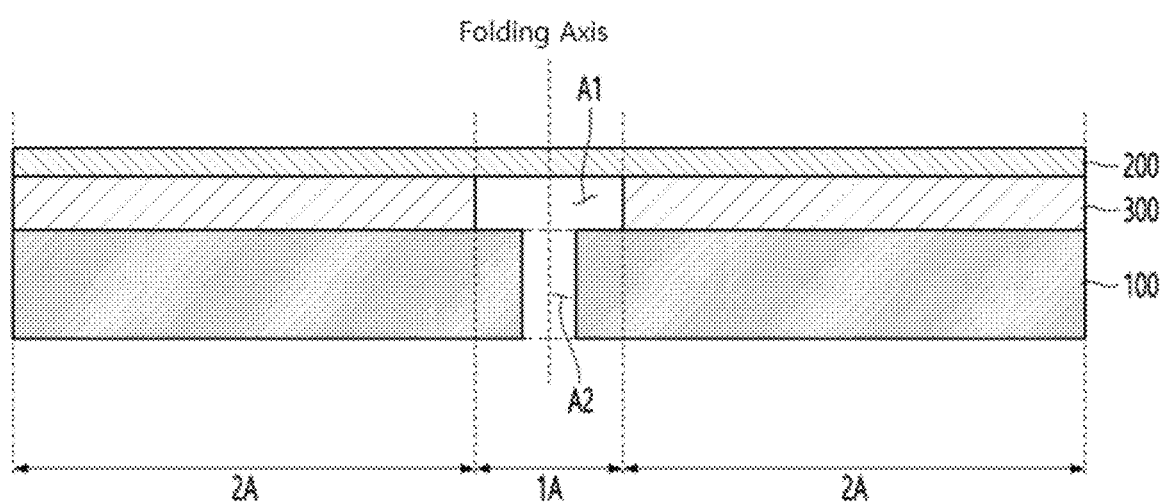

【FIG. 19】
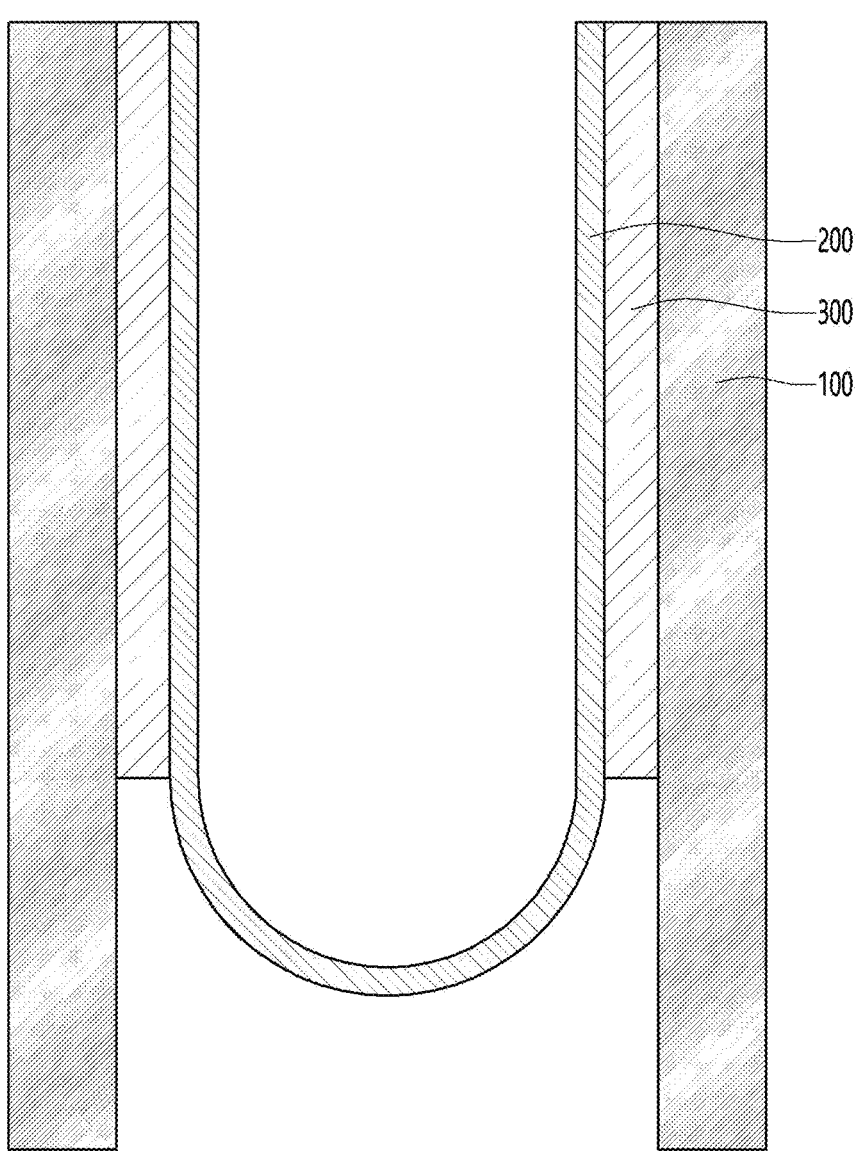

【FIG. 20】
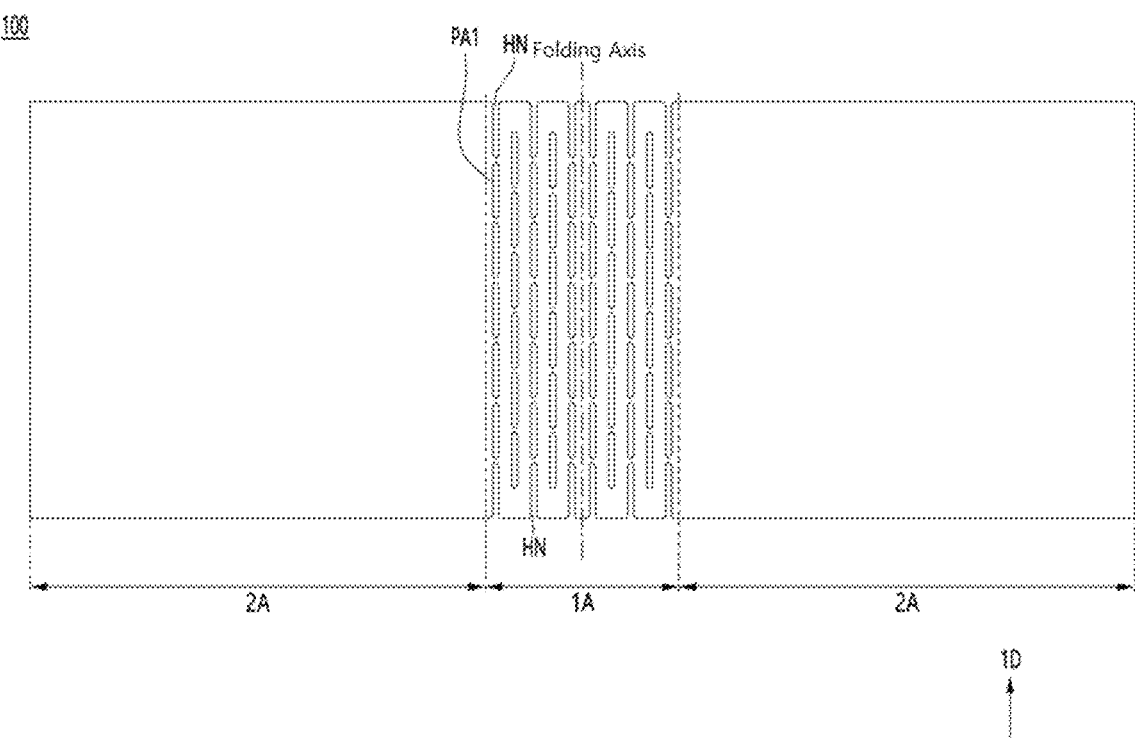

【FIG. 21】
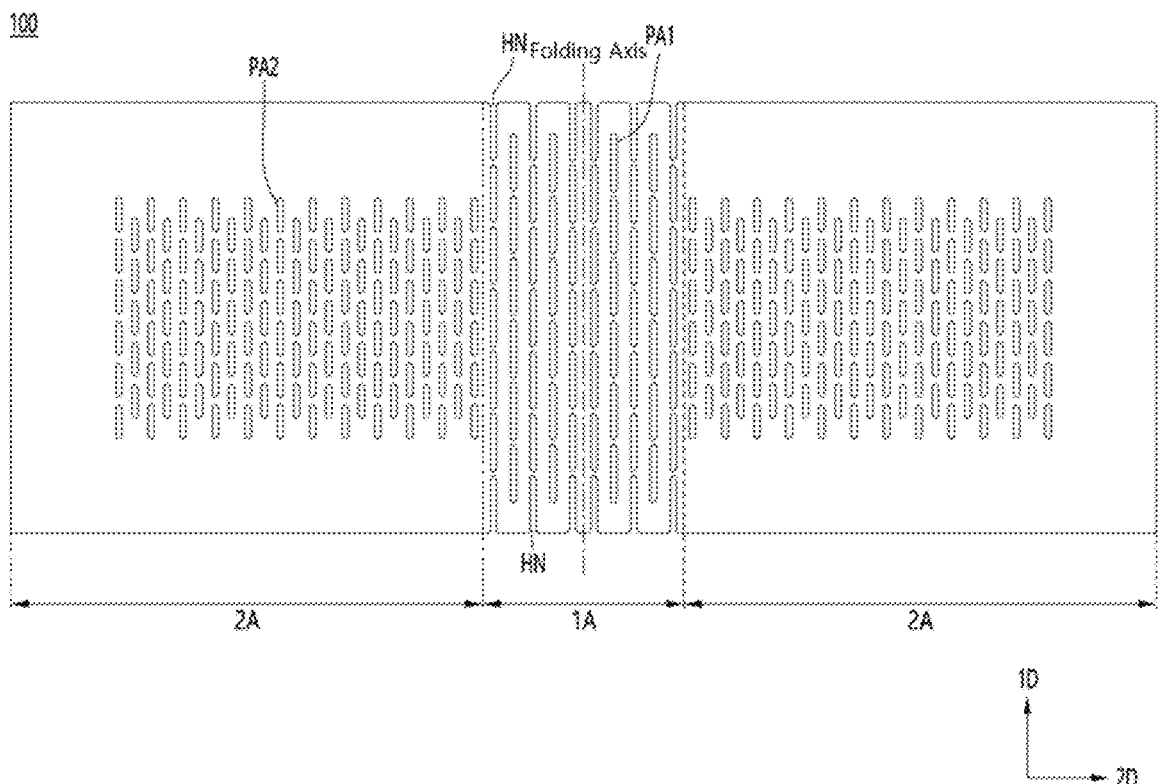
【FIG. 22】
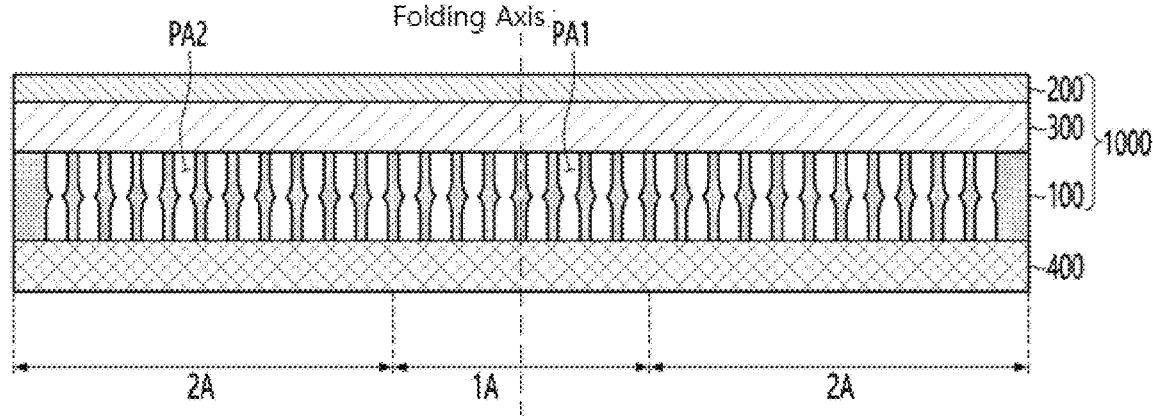

【FIG. 23】
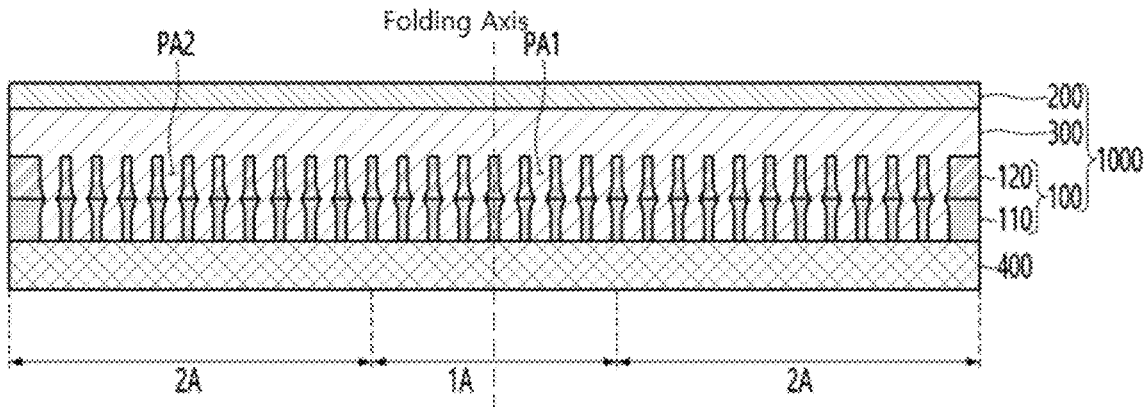
【FIG. 24】
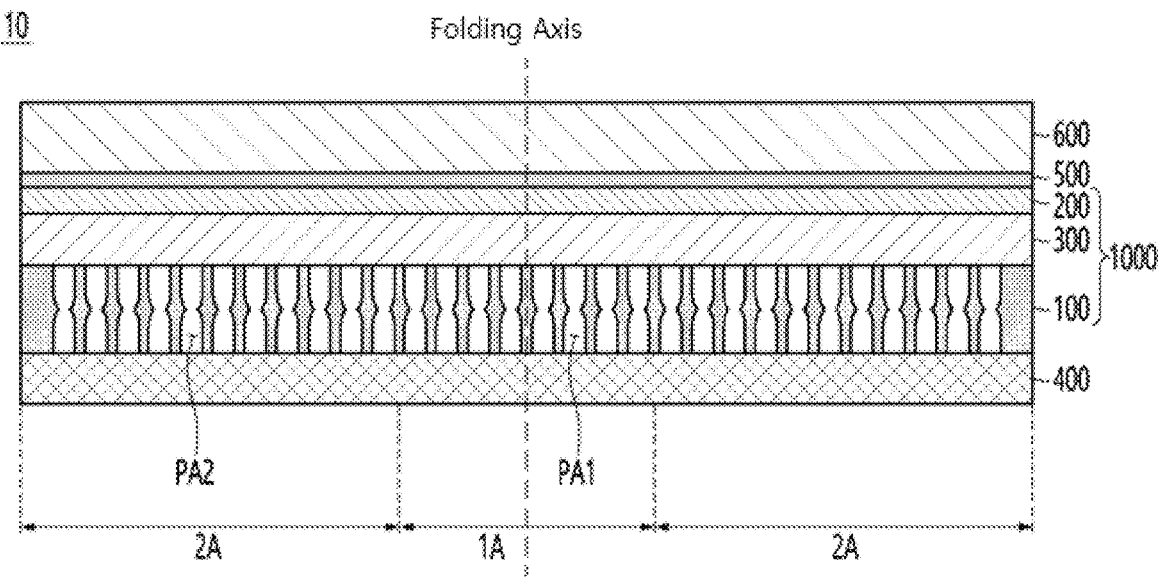

【FIG. 25】
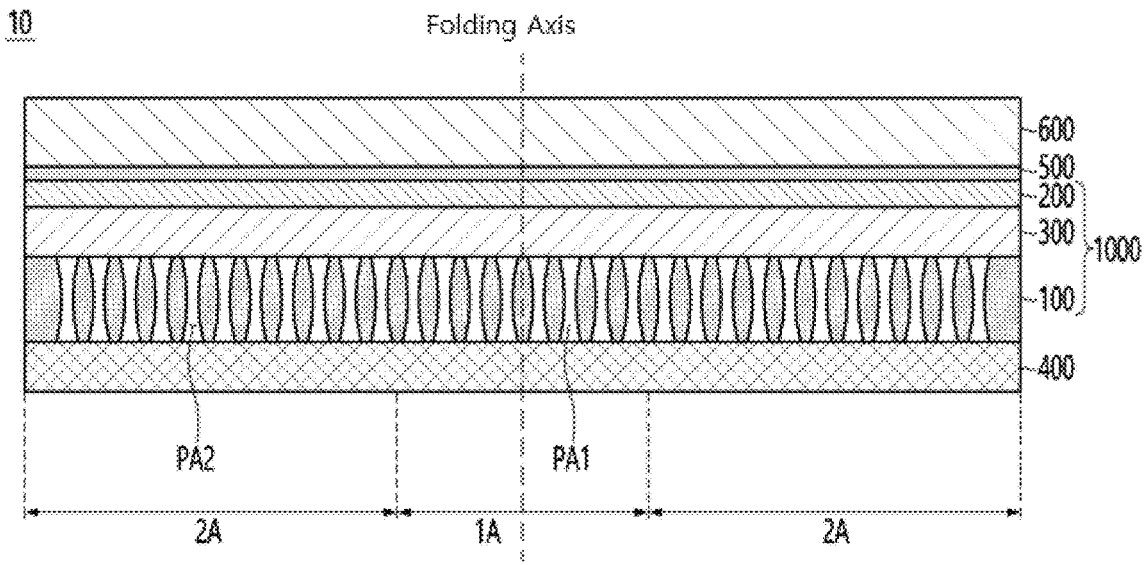
【FIG. 26】
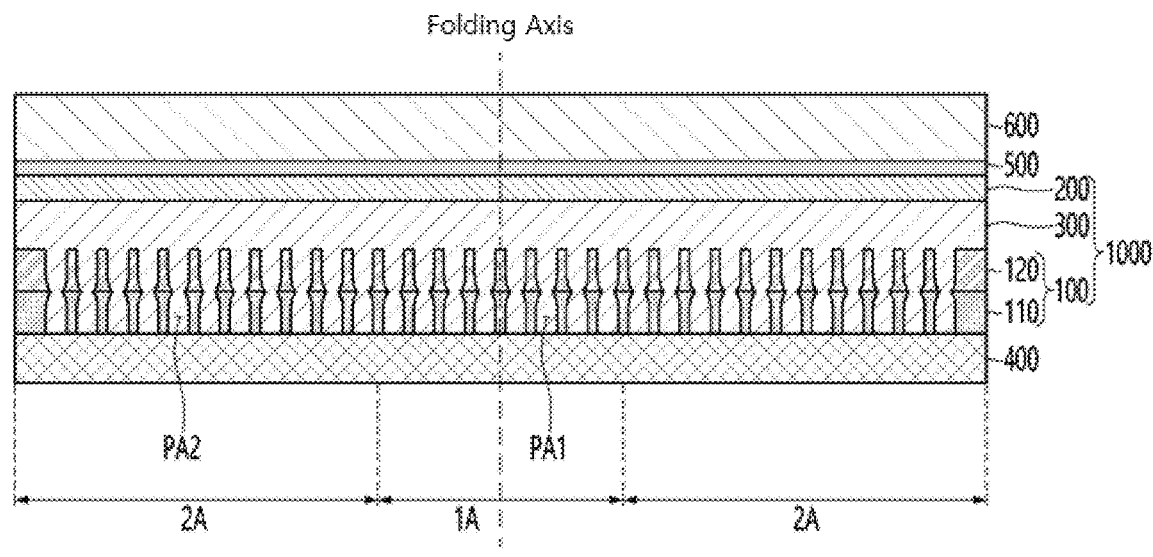

【FIG. 27】
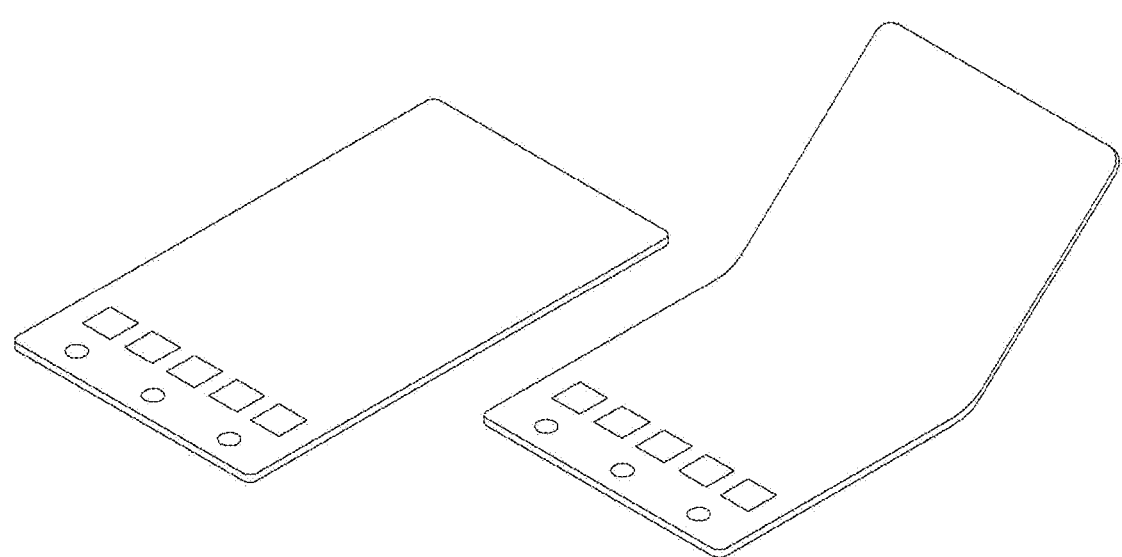

ELASTIC MEMBER AND DISPLAY DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/012212, filed Aug. 16, 2022, which claims priority to Korean Patent Application No. 10-2021-0118680, filed Sep. 6, 2021, whose entire disclosures are hereby incorporated by reference.

TECHNICAL FIELD

An embodiment relates to an elastic member and display device having the same.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display region may be increased, and a user may easily carry the display.

After the flexible or foldable display device is folded or bent, a restoration process of unfolding the flexible display device again may be repeated.

That is, since the flexible or foldable display device repeats folding and unfolding operations, a substrate of the flexible display device is repeatedly used, so that flatness may be deteriorated.

In detail, in the flexible or foldable display device, since a folding region is a region where stress is concentrated during repeated folding and unfolding, the flatness may be deteriorated compared with unfolding region.

Accordingly, there is a problem that cracks occur in the folding region or wrinkles visually recognized from the outside occur, and thus the lifespan of the flexible or foldable display device is reduced and the reliability is deteriorated.

Therefore, there is a need for an elastic member having a new structure capable of solving the above problems

DISCLOSURE

Technical Problem

Embodiments provide an elastic member capable of improved flatness even in repetitive folding and restoration processes, and a display device including the same.

Technical Solution

An elastic member according to an embodiment includes: a first region and a second region, wherein a first direction is defined as a width direction of the elastic member and a second direction defined as a longitudinal direction of the elastic member, wherein the first region is defined as a folding region that is folded with the first direction as a folding axis, and the second region is defined as an unfolding region, wherein the elastic member includes a first layer and a second layer on the first layer; wherein the second layer includes a base material and fibers disposed inside the base material, wherein the fibers are disposed while extending in the second direction.

Advantageous Effects

The elastic member according to an embodiment may improve tensile strength and yield strength of the second layer forming the elastic member. In detail, since the fibers are disposed inside the second layer, the overall tensile strength and yield strength of the second layer may be increased.

Accordingly, even if the elastic member is repeatedly folded, plastic deformation of the second layer of the elastic member may be prevented. Thereby, folding reliability and flatness of the elastic member are improved.

In addition, the elastic member according to the embodiment may have improved folding reliability by changing the characteristics of the layers according to the stress generated on each surface of the elastic member and the size of the stress.

Also, in the elastic member according to the embodiment, since only the second layer including plastic is folded, the curvature of the elastic member may increase. That is, the radius of curvature of the elastic member may be reduced. In addition, since the yield strength and tensile strength of the second layer are improved, the plastic deformation of the second layer is prevented. Thus, the folding reliability of the elastic member may be improved. That is, the elastic member according to the embodiment may have improved folding reliability while increasing the curvature.

DESCRIPTION OF DRAWINGS

FIG. 1 is a perspective view of a display device according to the embodiment.

FIG. 2 is a perspective view of an elastic member according to the embodiment.

FIG. 3 is a side view before folding of the elastic member according to the embodiment.

FIG. 4 is a side view after folding of the elastic member according to the embodiment.

FIG. 5 is a cross-sectional view of a layer structure of the elastic member according to a first embodiment.

FIG. 6 is a perspective view of a second layer of the elastic member according to the first embodiment.

FIGS. 7 to 9 are cross-sectional views taken along area A-A' of FIG. 6.

FIGS. 10 to 13 are views for explaining the arrangement of fibers of the second layer of the elastic member.

FIGS. 14 and 15 are cross-sectional views of another layer structure of the elastic member according to the first embodiment.

FIGS. 16 and 17 are cross-sectional views of the layer structure of the elastic member according to a second embodiment.

FIG. 18 is a cross-sectional view of the layer structure of the elastic member according to a third embodiment.

FIG. 19 is a cross-sectional view of a folded elastic member according to the third embodiment.

FIG. 20 is a top view of the elastic member according to the embodiment.

FIG. 21 is another top view of the elastic member according to the embodiment.

FIGS. 22 to 23 are cross-sectional views of a flexible support including the elastic member according to the embodiment.

FIGS. 24 to 26 are cross-sectional views of a display device including the flexible support according to the embodiment.

FIG. 27 is a view for explaining an application example of the display device according to the embodiment.

MODES OF THE INVENTION

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced. In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to other elements, but also when the element is "connected" or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment and a folding support and a display device including the same will be described with reference to the drawings.

FIG. 1 is a perspective view of the display device according to the embodiment. FIGS. 2 to 4 are perspective and cross-sectional views of the elastic member of the display device according to the embodiment.

Referring to FIG. 1, a display device 10 according to the embodiment may include an elastic member 1000 and a panel including a display panel 2000 and a touch panel 3000 disposed on the elastic member 1000.

The elastic member 1000 may support the display panel 2000 and the touch panel 3000. That is, the elastic member 1000 may be a support substrate supporting the display panel 2000 and the touch panel 3000.

Meanwhile, the touch panel 3000 may be integrally formed with the display panel 2000. For example, the touch panel 3000 may be integrally formed with the display panel 2000 in an on-cell or in-cell method.

The elastic member 1000 may include a metallic material and a non-metallic material. In detail, the elastic member 1000 may be formed of a plurality of layers, and the plurality of layers may include at least one of the metallic material and the non-metallic material. For example, the elastic member 1000 may include metal, metal alloy, plastic, a composite material (e.g., carbon fiber reinforced plastic, a magnetic or conductive material, a glass fiber reinforced material, etc.), ceramic, sapphire, glass, and the like.

The elastic member 1000 may be flexible or foldable. That is, the elastic member 1000 may be folded or bent in one direction. That is, the elastic member 1000 may be a substrate for display applied to a flexible display device or a foldable display device.

In the elastic member 1000, a first direction 1D and a second direction 2D that is different from the first direction 1D may be defined. For example, the first direction 1D may be defined as the same direction as a folding axis direction of the elastic member 1000. In addition, the second direction may be a direction perpendicular to the first direction.

One direction of the first direction 1D and the second direction 2D may be defined as a width direction of the elastic member 1000, and the other direction may be defined as a longitudinal direction of the elastic member 1000.

The elastic member 1000 may be folded with any one of the width direction and the longitudinal direction of the elastic member 1000 as a folding axis.

Hereinafter, for convenience of description, the first direction is defined as the same direction as the folding axis. In addition, the first direction is defined as the width direction of the elastic member 1000, and the second direction is defined as the longitudinal direction of the elastic member 1000.

The elastic member 1000 may include at least two regions. In detail, the elastic member 1000 may include a first region 1A and a second region 2A.

The first region 1A may be defined as a region where the elastic member 1000 is folded. That is, the first region 1A may be defined as a region where the elastic member 1000 and the display device 10 including the elastic member 1000 are folded. That is, the first region 1A may be a folding region.

In addition, the second region 2A may be defined as a region where the elastic member 1000 is not folded. That is, the second region 2A may be defined as a region where the elastic member 1000 and the display device 10 including the elastic member 1000 are not folded. That is, the second region 2A may be an unfolding region.

The first region 1A and the second region 2A will be described in detail below.

The display panel 2000 may be disposed on the elastic member 1000.

The display panel 2000 may include a plurality of pixels including a switching thin film transistor, a driving thin film transistor, a power storage device, and an organic light-emitting diode (OLED). In case of the organic light-emitting diode, deposition is possible at a relatively low temperature and may be mainly applied to the flexible display device for reasons of low power and high luminance. Here, the pixel refers to a minimum unit for displaying an image, and the display panel displays an image through the plurality of pixels.

The display panel may include a substrate, a gate line disposed on the substrate, a data line isolated from the gate line, and a common power line. In general, one pixel may be defined by the gate line, the data line, and the common power line as a boundary.

The substrate may include a material having flexible properties such as a plastic film, and the display panel 2000 may be implemented by disposing an organic light-emitting diode and a pixel circuit on a flexible film.

The touch panel 3000 may be disposed above the display panel 2000. The touch panel 3000 may implement a touch function in the foldable display device or the flexible display device, and the touch panel may be omitted in a foldable display device or a flexible display device that simply displays an image without the touch function.

The touch panel 3000 may include a substrate and a touch electrode disposed on the substrate. The touch electrode may sense a position of an input device touched by the foldable display device or the flexible display device by a capacitive type or a resistive type.

The substrate of the touch panel 3000 may include a material having flexible properties such as a plastic film, and the touch panel 3000 may be implemented by disposing the touch electrode on the flexible film.

As described above, when the touch panel 3000 is integrally formed with the display panel 2000, the substrate of the touch panel 3000 may be a substrate of the display panel or a part of the display panel. Through this, the touch panel 3000 and the display panel 2000 can be integrally formed, and a thickness of the display device may be reduced.

Meanwhile, the elastic member 1000 and the display panel 2000 may have different sizes.

For example, an area of the elastic member 1000 may be 90% or more to 110% or less of an area of the display panel 2000. In detail, the area of the elastic member 1000 may be 95% or more to 105% or less of the area of the display panel 2000. In more detail, the area of the elastic member 1000 may be 97% or more to 100% or less of the area of the display panel 2000.

When the area of the elastic member 1000 is 90% or less of the area of the display panel 2000, support force of the elastic member 1000 supporting the display panel 2000 or the touch panel 3000 is deteriorated, and thus a curl phenomenon or the like may occur in the unfolding region of the elastic member 1000. Accordingly, when a user visually recognizes a screen region, visibility may be deteriorated, and when a touch is driven, a screen of a touch region may be incomplete due to a curled region, and thus a touch malfunction may occur.

In addition, when the area of the elastic member 1000 increases to be 110% or more of the area of the display panel 2000, the support force for supporting the display panel or the touch panel may be secured by the elastic member 1000, but a bezel region of a display device including the substrate, the display panel, and the touch panel may increase. Accordingly, it is impossible to provide a wide effective screen region to the user, which may cause inconvenience in using the display device.

Meanwhile, although not shown in the drawings, a cover window protecting the foldable display device or the flexible display device may be additionally disposed above the touch panel 3000 or above the display panel 2000 (when the touch panel is omitted).

Meanwhile, the elastic member 1000, the display panel 2000, and the touch panel 3000 may be adhered to each other through an adhesive layer or the like.

As described above, the display device includes the elastic member 1000.

Referring to FIG. 2, the elastic member 1000 may be bent in one direction.

In detail, the elastic member 1000 may include a first surface 1S and a second surface 2S opposite to the first surface 1S. In the elastic member 1000, the first surface 15 or the second surface 2S may be bent to face each other. That is, the elastic member 1000 may be bent so that the surfaces on which the panels are disposed face each other. Alternatively, the elastic member 1000 may be bent so that a surface opposite to the surface on which the panels are disposed faces.

However, the embodiment is not limited thereto, and the second surface and the first surface of the elastic member 1000 may be bent to alternately face each other. That is, the elastic member 1000 may include a plurality of first regions and a plurality of second regions.

In the following description, as shown in FIG. 2, it will be mainly described that the elastic member 1000 is bent in a direction in which the first surfaces 1S face each other.

As described above, the elastic member 1000 may have the first region 1A and the second region 2A defined therein. The first region 1A and the second region 2A may be regions defined when the elastic member 1000 is bent in the direction in which the first surfaces 1S face each other.

In detail, the elastic member 1000 is bent in one direction, and the elastic member 1000 may be divided into the first region 1A that is folded (folding region) and the second region 2A that is not folded (unfolding region).

Referring to FIG. 3 and FIG. 4, the elastic member 1000 may include a first region 1A that is a region where the elastic member 1000 is bent. In addition, the elastic member 1000 may include a second region 2A that is not bent and is disposed adjacent to the first region 1A.

For example, the second region 2A may be formed on the left and right sides of the first region 1A, respectively, based on a bending direction of the elastic member 1000. That is, the second region 2A may be disposed at both ends of the first region 1A. That is, the first region 1A may be disposed between the second regions 2A.

However, the embodiment is not limited thereto, and the first region 1A may be further formed outside the second region 2A.

The first region 1A and the second region 2A may be formed on the same elastic member 1000. That is, the first region 1A and the second region 2A may be formed integrally with each other without being separated from the same one elastic member 1000.

Sizes of the first region 1A and the second region 2A may be different from each other. In detail, the size of the second region 2A may be greater than the size of the first region 1A.

In addition, an area of the first region 1A of the elastic member 1000 may be 1% or more to 30% or less of an entire area of the elastic member 1000. In detail, the area of the first region 1A of the elastic member 1000 may be 5% or more to 20% or less of the entire area of the elastic member 1000. The area of the first region 1A of the elastic member 1000 may be 10% or more to 15% or less of the entire area of the elastic member 1000.

When the area of the first region 1A of the elastic member 1000 is less than 1% of the entire area of the elastic member 1000, cracks may occur at the interface of the folding and unfolding regions of the elastic member 1000 when the folding and restoring of the substrate is repeated, and thus folding reliability of the elastic member 10000 may be deteriorated.

In addition, when the area of the first region 1A of the elastic member 1000 exceeds 30% of the entire area of the elastic member 1000, curl may occur in the folding region of the display panel 2000 when the substrate is folded. Accordingly, when the user visually recognizes the screen region, the visibility may be deteriorated, and when the touch is driven, the screen of the touch region may be incomplete due to the curled region, and thus the touch malfunction may occur.

In the drawings, it is illustrated that the first region 1A is positioned in a central portion of the elastic member 1000, but the embodiment is not limited thereto. That is, the first region 1A may be positioned in one end and an end region of the elastic member 1000. That is, the first region 1A may be positioned at one end and the end region of the elastic member 1000 such that the size of the first region 1A is asymmetric.

FIG. 4 is a side view of the substrate for display after the substrate is folded.

Referring to FIG. 4, the elastic member 1000 may be folded in one direction based on the folding axis. In detail, the first surfaces may be folded in a direction facing each other.

As the elastic member 1000 is folded in one direction, the first region 1A and the second region 2A may be formed on the elastic member 1000. That is, a folding region formed as the elastic member 1000 is folded in one direction and an unfolding region positioned at both ends of the folding region may be formed on the elastic member 1000.

The folding region may be defined as a region where a curvature R is formed, and the unfolding region may be defined as a region where the curvature R is not formed or the curvature is close to zero.

Referring to FIGS. 3 and 4, the elastic member 1000 may be folded in one direction to be formed in an order of the unfolding region, the folding region, and the unfolding region.

A plurality of pattern parts may be formed in at least one of the first region 1A and the second region 2A in order to reduce and distribute stress generated when the elastic member 1000 is folded. The pattern parts will be described in detail below.

Meanwhile, FIG. 4 illustrates that the first surfaces 1S of the elastic member 1000 are folded to face each other, but the embodiment is not limited thereto, and the second surfaces 2S may be folded to face each other.

In addition, FIG. 4 illustrates that the curvature is decreased (a radius of the curvature is increased) while the elastic member 1000 extends from a center of the folding axis, but the embodiment is not limited thereto. For example, the curvature may decrease or increase while the elastic member 1000 extends from the center of the folding axis. That is, the curvature may decrease and then increase while the elastic member 1000 extends from the center of the folding axis. Alternatively, the elastic member 1000 may be formed in a shape in which the curvature decreases and then increases, or the curvature decreases and then increases, and then decreases again while extending from the center of the folding axis. That is, a folding shape of the elastic member 1000 may be formed in various folding shapes as well as a U-shaped shape.

Meanwhile, the elastic member 1000 may be formed of a plurality of layers to realize strength and folding characteristics of the elastic member. For example, the elastic member 1000 may be formed by stacking a plurality of layers having different characteristics such as yield strength, elongation, and compressibility.

At this time, in the folding region of the elastic member, compressive stress and tensile stress generated according to folding may occur. At this time, the surface of the layer having a low tensile strength among the layers of the elastic member becomes uneven due to the tensile stress generated during folding, and thereby the overall flatness of the elastic member may be reduced.

Hereinafter, an elastic member capable of preventing an increase in flatness in a folding area when the elastic member is folded and restored by controlling characteristics of layers constituting the elastic member will be described.

Hereinafter, a layer structure of the elastic member described above will be described with reference to the drawings.

First, the layer structure of the elastic member according to the first embodiment will be described with reference to FIGS. 5 to 9.

Referring to FIG. 5, the elastic member 1000 may include a first layer 100, a second layer 200 and a third layer 300. In detail, the elastic member 1000 may include the first layer 100, the second layer 200 on the first layer 100, and the third layer 300 between the first layer 100 and the second layer 200.

The first layer 100 may include metal. In detail, the first layer 100 may include a metal and a metal alloy. For example, the first layer may include stainless (SUS) or copper (Cu). Alternatively, the first layer 100 may be formed of an alloy including at least one of nickel (Ni), chromium (Cr), iron (Fe), titanium (Ti), manganese (Mn), molybdenum (Mo), silver (Ag), zinc (Zn), nitrogen (N), and aluminum (Al) together with copper (Cu).

A plurality of pattern parts may be disposed on the first layer 100. In detail, in the first layer 100, the pattern parts may be disposed on an area corresponding to at least one of the first region 1A and the second region 2A of the elastic member.

The pattern parts may serve to reduce stress generated by folding when the first layer 100 including metal is folded.

The pattern parts may be disposed in a shape of a hole formed through the entirety of the first layer 100 or a shape formed through a groove partially through the first layer 100.

The second layer 200 may be disposed on the first layer 100.

The second layer 200 may be disposed on the first layer 100 to planarize the surface of the first layer 100. As described above, the first layer 100 is formed with a plurality of pattern parts having the hole or the groove shape, and the surface of the first layer 100 may not be flat due to the pattern parts. Accordingly, when a panel or the like is directly attached to the first layer 100, the adhesive force with the panel may decrease due to the surface characteristics of the first layer 100.

Accordingly, by disposing the second layer 200 on the first layer 100, the adhesive surface of the elastic member 1000 bonded to the panel may be flattened. That is, the second layer 200 may be defined as a planarization layer of the elastic member 1000.

The second layer 200 may include metal or non-metal. In detail, the second layer 200 may include metal or plastic. The second layer 200 may include other materials according to characteristics to be implemented among the folding characteristics and strength of the elastic member 1000.

For example, the second layer 200 may include plastic. The second layer 200 may include a material having high elasticity and strength. For example, the second layer 200 may include a material including fibers.

The second layer 200 will be described in detail below.

The third layer 300 may be disposed between the first layer 100 and the second layer 200. The third layer 300 may be disposed between the first layer 100 and the second layer 200 to adhere the first layer 100 and the second layer 200. That is, the third layer 300 may serve as an adhesive layer in the elastic member 1000.

For example, the third layer 300 may include pressure sensitive adhesive (PSA), but the embodiment is not limited thereto.

FIGS. 6 to 8 are perspective and cross-sectional views of the second layer 200.

FIG. 6 is a perspective view of a portion of the second layer 200. FIGS. 7 and 8 are cross-sectional views taken along area A-A' of FIG. 6.

Referring to FIGS. 6 to 8, the second layer 200 may include a base material 210 and a plurality of fibers 220 disposed inside the base material 210.

The base material 210 may support the fibers 220 disposed inside the second layer 200. For example, the base material 210 may be formed in a structure in which the fibers 220 are impregnated into the base material 210.

The base material 210 may include a resin material. For example, the base material 210 may be include at least one resin material selected from polyimide, polysulfone, polyphenylene sulfide, polyamide-imide, polyether ether ketone, Liquid-Crystal Polyester, Polyamide, Polyoxymethylene, Polycarbonate, Polybutylene terephthalate, modified polyphenyleneoxide, epoxy and acrylate.

The fiber 220 may have a set length and diameter. For example, the diameter of the fiber 220 may be 0.0001 mm to 0.01 mm. Also, the length of the fiber 220 may vary according to the size of the second layer 200.

The fiber 220 may be disposed inside the base material 210. That is, the fiber 220 may be impregnated into the resin material of the base material 210.

The fiber 220 may include a material having high elasticity. For example, the fiber 220 may include at least one of carbon fiber, glass fiber, and ceramic fiber.

The second layer 200 may include a 1a region 1Aa corresponding to the first region 1A of the elastic member 1000 and a 2a region 2Aa corresponding to the second area 2A of the elastic member 1000.

Referring to FIGS. 7 to 9, the fiber 220 may be disposed in at least one of the 1a region 1Aa and the 2a region 1Aa of the second layer 200.

For example, referring to FIG. 7, the fibers 220 may be disposed in both the 1a region 1Aa and the 2a region 2Aa of the second layer 200. Accordingly, in the second layer 200, characteristics of the 1a region 1Aa that is the folding area and the 2a region 2Aa that is the unfolding area may be similar. Accordingly, it is possible to prevent deformation of the second layer 200 from occurring during the process of forming the second layer 200 due to differences in characteristics.

Alternatively, referring to FIG. 8, the fiber 220 may be disposed in any one of the 1a region 1Aa and the 2a region 2Aa of the second layer 200. For example, the fibers 220 may be disposed only in the 1a region 1Aa, which is a folding region of the second layer 200, or only in the 2a region 2Aa, which is an unfolding region of the second layer 200.

When the fibers 220 are disposed only in the folding region of the second layer 200, sufficient strength and elasticity may be secured in the folding region of the second layer 200. Accordingly, reduction in flatness due to deformation of the second layer 200 during folding may be prevented.

Alternatively, referring to FIG. 9, the fibers 220 may be disposed in both the 1a region 1Aa and the 2a region 2Aa of the second layer 200. Also, more fibers 220 may be disposed in the 1a region 1Aa.

For example, a region where the fiber 220 and the 1a region 1Aa overlap may be larger than a region where the fiber 220 and the 2a region 2Aa overlap. Alternatively, the region where the fiber 220 and the 1a region 1Aa overlap may be smaller than the region where the fiber 220 and the 2a region 2Aa overlap. However, a volume % of the fiber 220 with respect to the total area of the 2a region 2Aa may be smaller than a volume % of the fiber 220 with respect to the total area of the 1a region 1Aa.

Accordingly, sufficient strength and elasticity may be secured in the folding region of the second layer 200 by disposing the fibers 220 in a larger amount in the folding area of the second layer 200. Accordingly, reduction in flatness due to deformation of the second layer 200 during folding may be prevented. In addition, in the second layer 200, a characteristic difference between the 1a region 1Aa that is the folding region and 2a region 2Aa that is the unfolding region may be reduced. Accordingly, it is possible to prevent deformation of the second layer 200 from occurring during the process of forming the second layer 200 due to differences in characteristics.

The second layer 200 may have a thickness within a set range. The thickness of the second layer 200 may be defined as the thickness of the base material 210. In detail, the thickness T of the second layer 200 may be 15 μm or more. In more detail, the thickness T of the second layer 200 may be 15 μm to 200 μm. In more detail, the thickness T of the second layer 200 may be 30 μm to 100 μm.

When the thickness T of the second layer 200 is less than 15 μm, it is difficult to arrange fibers inside the second layer 200, and thus process efficiency may decrease. In addition, when the thickness T of the second layer 200 exceeds 200 μm, the overall thickness of the display device including the elastic member may increase, and folding reliability of the elastic member may decrease.

The folding direction of the second layer 200 and the elastic member 1000 may be defined by the length direction of the fibers 220 of the second layer 200.

In detail, the folding axis of the second layer 200 and the elastic member 1000 may be different from the longitudinal direction of the second layer 200. In more detail, the folding axes of the second layer 200 and the elastic member 1000 may be defined in a direction perpendicular to the longitudinal direction of the second layer 200. In more detail, the folding axis of the elastic member 1000 may be defined in a direction perpendicular to or close to the average in the longitudinal direction of the fibers 220.

FIGS. 10 to 13 are views for explaining various arrangements of the fibers 220 of the second layer 200.

Referring to FIGS. 10 to 13, the fibers 220 may be disposed in various directions inside the base material 210.

Referring to FIG. 10, the fibers 220 may be disposed while extending in one direction in the longitudinal direction of the second layer 200.

Alternatively, referring to FIG. 11, the fiber 220 may be tilted at a predetermined angle with the longitudinal direction of the second layer 200 and extended in one direction.

Alternatively, referring to FIG. 12, the fibers 220 may be disposed while extending in multiple directions. In detail, the fibers 220 may include fibers extending in one direction in the length direction of the second layer 200 and fibers tilting and extending at a predetermined angle with the length direction of the second layer 200.

Alternatively, referring to FIG. 13, the fibers may include curves and may be disposed while extending in one direction or in multiple directions in the longitudinal direction of the second layer 200.

Accordingly, the second layer 200 may include an alignment mark 250 for checking the folding direction. For example, an alignment mark 250 capable of defining and confirming the length direction of the fibers 220 may be formed on at least one of one surface and the other surface of the second layer 200.

The alignment mark 250 may be disposed on the 2a region 2Aa of the second layer 200. Since the alignment mark 250 is disposed on the 2a area 2Aa of the second layer 200, which is an unfolding area other than a folding area, damage or deformation of the alignment mark 250 may be prevented during folding. In addition, it is possible to prevent the folding reliability from being reduced by the alignment mark.

The alignment mark 250 may be formed by etching the surface of the second layer 200. Alternatively, the alignment mark 250 may be formed on the second layer 200 by a printing process.

Meanwhile, referring to FIGS. 14 and 15, the first layer 100 may be formed in multiple layers.

Referring to FIG. 14, the first layer 100 may include a 1-1 layer 110 and a 1-2 layer 120 on the 1-1 layer 110.

The 1-1 layer 110 and the 1-2 layer 120 may include a metal material. In detail, the 1-1 layer 110 and the 1-2 layer 120 may include different metal materials.

For example, the 1-1 layer 110 and the 1-2 layer 120 may include materials having different thermal conductivity. In detail, the 1-1 layer 110 may include a material having higher thermal conductivity than the 1-2 layer 120.

In addition, the 1-1 layer 110 and the 1-2 layer 120 may include materials having different yield strengths. In detail, the 1-2 layer 120 may include a material having higher yield strength than the 1-1 layer 110.

For example, the 1-1 layer 110 may include copper or a copper alloy, and the 1-2 layer 120 may include stainless (SUS), but the embodiment is not limited thereto. The 1-1 layer 110 and the 1-2 layer 120 may include various materials that satisfy the thermal conductivity and the yield strength.

In addition, the 1-1 layer 110 and the 1-2 layer 120 may be disposed in direct contact with each other. In detail, the 1-1 layer 110 and the 1-2 layer 120 may be manufactured in a clad method.

A clad bonding is a method of bonding the 1-1 layer 110 and the 1-2 layer 120 by welding, rolling, casting, extrusion, or the like without bonding using an adhesive. The clad bonding destroys the mutual tissue of each layer and stabilizes the bonding of each layer by penetration between tissues, so that the bonding strength may be more excellent over time.

For example, bonding may be formed by inducing atomic diffusion between heterogeneous materials at the interface of different layers by rolling. Unlike adhesion using an adhesive, the clad bonding may be processed into a curved surface. In addition, since the clad bonding uses atomic diffusion bonding, it may maintain a bonding state for a longer time than adhesion using an adhesive.

The 1-1 layer 110 and the 1-2 layer 120 may have the same or different thicknesses. For example, in order to improve heat dissipation characteristics of the elastic member 1000, the thickness of the 1-1 layer 110 may be greater than that of the 1-2 layer 120. Alternatively, in order to improve the folding characteristics of the elastic member 1000, the thickness of the 1-2 layer 120 may be greater than that of the 1-1 layer 110.

That is, the thickness of the 1-1 layer 110 and the thickness of the 1-2 layer 120 may vary depending on characteristics to be implemented in the elastic member 1000.

Referring to FIG. 15, the first layer 100 may include a 1-1 layer 110, a 1-2 layer 120 on the 1-1 layer 110, and a 1-3 layer 130 the 1-2 layer 120.

The 1-1 layer 110, the 1-2 layer 120, and the 1-3 layer 130 may include a metal material. In detail, the 1-1 layer 110, the 1-2 layer 120, and the 1-3 layer 130 may include the same or different metal materials.

For example, the 1-1 layer 110 and 1-3 layer 130 may include the same material, and the 1-2 layer 120 may include a material different from the 1-1 layer 110 and the 1-3 layer 130.

The 1-1 layer 110 and the 1-3 layer 130 may include a material having different thermal conductivity from the 1-2 layer 120. In detail, the 1-1 layer 110 and the 1-3 layer 130 may include a material having a greater thermal conductivity than the 1-2 layer 120.

In addition, the 1-1 layer 110 and the 1-3 layer 130 may include materials with different yield strengths from the 1-2 layer 120. In detail, the 1-2 layer 120 may include a material having a greater yield strength than the 1-1 layer 110 and the 1-3 layer 130.

For example, the 1-1 layer 110 and the 1-3 layer 130 may include copper or a copper alloy, and the 1-2 layer 120 may include (SUS), but the embodiment is not limited thereto. The 1-1 layer 110, the 1-2 layer 120 and the 1-3 layer 130 may include various materials that satisfy the thermal conductivity and the yield strength.

In addition, the 1-1 layer 110, the 1-2 layer 120, and the 1-3 layer 130 may be disposed in direct contact with each other. In detail, the 1-1 layer 110, the 1-2 layer 120, and the 1-3 layer 130 may be manufactured by the clad method described above.

The 1-1 layer 110, the 1-2 layer 120, and the 1-3 layer 130 may be disposed to have the same or different thicknesses. For example, in order to improve heat dissipation characteristics of the elastic member 1000, the thickness of the 1-1 layer 110 and the 1-3 layer 130 may be greater than that of the 1-2 layer 120. Alternatively, in order to improve folding characteristics of the elastic member 1000, the thickness of the 1-2 layer 120 may be greater than that of the 1-1 layer 110 and the 1-3 layer 130.

That is, the thickness of the 1-1 layer 110, the thickness of the 1-2 layer 120 and the thickness of the 1-3 layer 130 may vary depending on characteristics to be implemented in the elastic member 1000.

In conclusion, the first layer of the elastic member may include at least one of the 1-1 layer, the 1-2 layer, and the 1-3 layer.

The elastic member according to the first embodiment may include the second layer including the fiber. The second layer may be disposed on the first layer to planarize the elastic member.

Since the second layer includes a plastic material, the tensile strength and yield strength may be smaller than those of the first layer. Accordingly, plastic deformation may occur in the folding region of the second layer in the process of folding the elastic member. Therefore, when the elastic member is repeatedly folded, repeated plastic deformation occurs, which may reduce the flatness of the folding area of the second layer.

The elastic member according to the first embodiment may improve tensile strength and yield strength of the second layer forming the elastic member. In detail, by disposing fibers inside the second layer, the overall tensile strength and yield strength of the second layer may be increased.

Accordingly, by preventing plastic deformation of the elastic member in the second layer even in repeated folding of the elastic member, folding reliability and flatness of the elastic member may be improved.

Hereinafter, a layer structure of the elastic member according to a second embodiment will be described with reference to FIGS. 16 and 17. In the description of the elastic member according to the second embodiment, a description similar to the elastic member according to the first embodiment described above will be omitted. In addition, in the description of the elastic member according to the second embodiment, the same drawing code is assigned to the same configuration as the elastic member according to the first embodiment described above.

Referring to FIGS. 16 and 17, the elastic member 1000 may include a second layer 200.

In detail, the elastic member 1000 may include a 2-1 layer 201 and a 2-2 layer 202 disposed on the 2-1 layer 201. That is, the elastic member according to the second embodiment may include the 2-1 layer 201 corresponding to the first layer described above and the 2-2 layer 202 corresponding to the second layer described above.

The 2-1 layer 201 may include a first base material 211 and a first fiber 221. In addition, the 2-2 layer 202 may include a second base material 212 and a second fiber 222.

The 2-1 layer 201 and the 2-2 layer 202 may have the same thickness. Alternatively, the 2-1 layer 201 and the 2-2 layer 202 may have different thicknesses.

The first base material 211 and the second base material 212 may directly or indirectly contact each other. In detail, as shown in FIG. 12, the first base material 211 and the second base material 212 may be disposed in direct contact with each other. Alternatively, as shown in FIG. 13, an adhesive layer 203 is disposed between the first base material 211 and the second base material 212, and the first base material 211 and the second base material 212 may be bonded by the adhesive layer 203.

The first base material 211 and the second base material 212 may include the same or different materials. In addition, the first fiber 221 and the second fiber 222 may include the same or different materials.

For example, according to the folding direction of the elastic member, the inner and outer surfaces of the elastic member may be defined. Compressive stress may be generated on the folding inner surface of the elastic member, and tensile stress may be generated on the outer surface of the elastic member.

When the first base material 211 and the second base material 212 include different materials, or when the first fiber 221 and the second fiber 222 include different materials, the elastic member may have different properties on one surface and the other surface.

For example, when the 2-1 layer 201 becomes the folding outer surface and the 2-2 layer 202 becomes the folding inner surface, the base material and fiber of the 2-1 layer 201 may include materials that can prevent plastic deformation due to tensile stress, and the base material and fiber of the 2-2 layer 202 may include materials that can prevent plastic deformation due to compressive stress.

Accordingly, the elastic member according to the second embodiment may improve the folding reliability of the elastic member by changing the characteristics of the layers according to the stress and stress generated on each surface of the elastic member.

Hereinafter, a layer structure of the elastic member according to a third embodiment will be described with reference to FIGS. 18 and 19. In the description of the elastic member according to the third embodiment, a description similar to the elastic member according to the first embodiment described above will be omitted. In addition, in the description of the elastic member according to the second embodiment, the same drawing code is assigned to the same configuration as the elastic member according to the first embodiment described above.

Referring to FIGS. 18 and 19, the elastic member 1000 may include a first layer 100, a second layer 200 and a third layer 300.

The elastic member according to the third embodiment may have the same layer structure as the elastic member according to the first embodiment described above.

However, unlike the elastic member according to the first embodiment described above, the elastic member according to the third embodiment may have voids in the first layer 100 and the third layer 300, respectively.

In detail, the first layer 100 may include a first void A1, and the third layer 300 may include a second void A2.

The first void A1 and the second void A2 may be disposed in the first region 1A that is a folding region of the elastic member 1000.

The first layer 100 may be separated into two first layers by the first void A1, and the third layer 300 may be separated into two third layers by the second void A2.

The first void A1 and the second void A2 may have different widths. In detail, a width of the first void A1 may be smaller than a width of the second void A2. In the first layer 100, since the width of the first void A1 gradually increases with curvature as the elastic member is folded, the width of the first void A1 may be reduced.

The folding region of the elastic member 1000 may be formed only in the second layer 200 by the first void A1 and the second void A2. That is, the first layer 100 only serves to support the second layer 200, and may not be folded when the elastic member 1000 is folded Referring to FIG. 19, when the elastic member 100 is folded, the first layer 100 and the third layer 300 may only increase the widths of the first void A1 and the second void A2, and may not be folded, and only the second layer 200 may be folded forming a folding region.

Accordingly, since only the second layer 200 including plastic is folded in the elastic member according to the third embodiment, the curvature of the elastic member may be increased, that is, the radius of curvature may be reduced. In addition, as described above, since yield strength and tensile strength of the second layer 200 are improved, plastic deformation of the second layer 200 is prevented, thereby improving folding reliability of the elastic member. That is, the elastic member according to the third embodiment may have improved folding reliability while increasing a folded curvature.

Hereinafter, the pattern part formed on the first layer 100 of the elastic member will be described in more detail with reference to FIGS. 20 and 21.

FIGS. 20 and 21 are top views of the first layer 100 of the elastic member.

Referring to FIGS. 20 and 21, the first layer 100 of the elastic member may include a first region 1A that is the folding area and a second region 2A that is the unfolding area.

The first region 1A and the second region 2A may have different widths. In detail, the width of the first region 1A may be smaller than that of the second region 2A.

Referring to FIG. 20, the first layer 100 may include a plurality of pattern parts PA. In detail, the first layer 100 may include a first pattern part PA1 disposed in the first region 1A. The first pattern part PA1 may reduce compressive stress and tensile stress generated when the first layer 100 is folding and restoration.

The first pattern part PA1 may be formed in a hole or groove shape.

In detail, the first pattern part PA may be formed in a hole shape penetrating one surface of the first layer 100 and the other surface opposite to the one surface. Alternatively, the first pattern part PA1 may be formed in a groove shape formed on one surface or the other surface.

The first pattern part PA1 disposed in the first region 1A, which is a region where the first layer 100 is folded, may easily fold the elastic member 1000 including the first layer 100. In detail, the thickness of the elastic member 1000 is reduced in a region where the elastic member 1000 is folded by the first pattern part PAL Accordingly, since the compressive stress is reduced, the elastic member 1000 may be easily folded.

Also, referring to FIG. 21, the first layer 100 may further include a second pattern part PA2. In detail, the first layer 100 may further include the second pattern part PA2 disposed in the second region 2A.

The second pattern part PA2 may be formed in a hole or groove shape.

In detail, the second pattern part PA2 may be formed in a hole shape penetrating one surface and the other surface of the first layer 100. Alternatively, the second pattern part PA2 may be formed in a groove shape formed on one surface or the other surface of the first layer 100.

The second pattern part PA2 disposed in the second region 2A, which is a region where the first layer 100 is not folded, may similarly maintain physical characteristics of the first region 1A and the second region 2A.

In detail, a deformation difference due to heat between the first region 1A and the second region 2A where the first pattern part PA1 is disposed may be reduced by the second pattern part PA2. That is, since pattern parts are formed in both the first region 1A and the second region 2A, when heat is applied to the first layer 100, the difference in deformation due to heat between the first region 1A and the second region 2A may be reduced. Accordingly, it is possible to prevent the first layer 100 from being bent or distorted due to the deformation difference between the first region 1A and the second region 2A.

In addition, the stress unevenness of the first region 1A and the second region 2A may be reduced by the second pattern part PA2 formed in the second region 2A to prevent bending of the elastic member.

The second pattern part PA2 may be formed in the same or similar shape as the first pattern part PAL In detail, the second pattern part PA2 is formed in a shape having a long direction and a short direction. In addition, the long direction of the second pattern part PA2 and the long direction of the first pattern part PA1 extend in the same or similar direction to each other. Also, the short direction of the second pattern part PA2 and the short direction of the first pattern part PA1 may extend in the same or similar direction.

Meanwhile, the first layer 100 may include a hinge part HN. In detail, a plurality of hinge parts HN may be disposed in the first region 1A of the first layer 100. The hinge part HN is a region opened at an end region of the first layer 100 for folding of the first layer 100, and may be formed only in the first region 1A. Accordingly, the hinge part HN is a point at which folding of the first layer 100 starts, and the first region 1A and the second region 2A of the first layer 100 may be divided depending on whether the hinge part is formed or not.

Hereinafter, with reference to FIGS. 22 and 23, a folding support including the elastic member according to the above-described embodiment will be described.

Referring to FIGS. 22 and 23, the folding support may include the elastic member and a protective layer 400. FIG. 22 is a view showing a folding support in which the third layer is not disposed inside the pattern part of the first layer. FIG. 23 is a view showing a folding support in which the third layer is formed of a plurality of layers and the third layer is disposed inside the pattern part of the first layer.

The folding support may include the aforementioned elastic member 1000 and the protective layer 400 disposed under the elastic member 1000. In detail, the protective layer 400 may be disposed under the first layer 100 or the 1-1 layer 110 of the elastic member 1000.

Although not shown in the drawing, an adhesive layer is disposed between the protective layer 400 and the first layer 100 or between the protective layer 400 and the 1-1 layer 110, and the elastic member 1000 and the protective layer 400 may be bonded by the adhesive layer.

The protective layer 400 may have a color. For example, the protective layer 400 may be formed in a black-based color.

The protective layer 400 may include metal particles. For example, the protective layer 400 may include copper particles. Accordingly, since the thermal conductivity of the protective layer 400 is improved, heat generated in the display device may be released by the protective layer 400.

The protective layer 400 may be disposed on one region of the elastic member 1000. In detail, the protective layer 400 may be disposed in a region corresponding to the first region 1A of the elastic member 1000. Alternatively, the protective layer 400 may be disposed in regions corresponding to the first region 1A and the second region 2A of the elastic member 1000.

For example, the protective layer 400 may be disposed in a region corresponding to the first region 1A and the second region 2A of the elastic member 1000, and may be disposed in an area smaller than the combined area of the first region 1A and the second region a 2A. In detail, the protective layer 400 may be disposed in an area of 80% to 90% of the sum of the area of the first region 1A and the area of the second region 2A of the elastic member.

Also, the thickness of the protective layer 400 may be smaller than the total thickness of the elastic member 1000. That is, the thickness of the protective layer 400 may be smaller than the sum of the thicknesses of the first layer, the second layer, and the third layer of the elastic member 400.

Hereinafter, a display device including a folding support according to the above-described embodiment will be described with reference to FIGS. 24 to 26.

Referring to FIGS. 24 to 26, the display device 10 may include the folding support and a panel. FIG. 20 is a view showing the display device in which the third layer of the elastic member is not disposed inside the pattern part of the first layer. FIG. 21 is a view showing the display device in which a third layer of the elastic member is formed of a plurality of layers and the third layer is disposed inside the pattern part of the first layer.

Meanwhile, the pattern parts PA1 and PA2 formed on the first layer 100 may be formed in various shapes as shown in FIGS. 24 and 25.

The display device 10 may include the folding support and a panel layer 600 disposed on the folding support and including a display panel and/or a touch panel.

The folding support may include the elastic member 1000 including the first layer 100, the second layer 200, and the third layer 300, and a protective layer 400 disposed under the elastic member 1000. In detail, the protective layer 400 may be disposed under the first layer 100 or the 1-1 layer 110 of the elastic member 1000.

An adhesive layer 500 is disposed between the elastic member 1000 and the panel layer 600, and the elastic member 1000 and the panel layer 600 may be bonded by the adhesive layer 500.

As described above, since an adhesive surface of the elastic member 1000 may be flattened by the second layer 200, the elastic member and the panel layer may be stably bonded without a step.

The adhesive layer 500 between the elastic member 1000 and the panel layer 600 may have characteristics different from those of the third layer 300 of the elastic member 1000.

In detail, the adhesive layer 500 may have a smaller thickness than the third layer 300. For example, the adhesive layer 500 may have a thickness of 5 μm to 15 μm.

Also, the adhesive layer 500 may have lower adhesive properties than the third layer 300. In detail, the adhesive strength of the adhesive layer 500 may be 400 or less.

In addition, the adhesive layer 500 and the third layer 300 may have different elastic modulus. That is, the adhesive layer 500 does not have the same storage modulus, creep recovery, and tangent delta values as the third layer. Accordingly, the adhesive layer 500 may not have elastic properties other than adhesive properties.

FIG. 27 is a view for explaining an example in which an elastic member according to embodiments is applied.

Referring to FIG. 27, the elastic member according to the embodiments may be applied to a flexible or foldable display device for displaying a display.

For example, the elastic member according to the embodiments may be applied to a flexible display device such as a mobile phone or a tablet.

Such an elastic member may be applied to a flexible display device such as a mobile phone or a tablet that is flexible, bent, or folded.

The elastic member is applied to the flexible display device such as the mobile phone or the tablet that is flexible, bent or folded and improves the folding reliability in a display device that is repeatedly folded or folded, thereby improving the reliability of the flexible display device.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present disclosure.

In addition, embodiments are mostly described above, but the embodiments are merely examples and do not limit the present disclosure, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present disclosure defined in the following claims.

The invention claimed is:

1. An elastic member foldable with respect to a folding axis, the elastic member comprising:

a first region and a second region, wherein a first direction is defined as a width direction of the elastic member and is a same direction as a direction in which the folding axis extends and a second direction is defined as a longitudinal direction of the elastic member and is a direction perpendicular to the direction in which the folding axis extends and the first direction, wherein the first region is defined as a folding region that is folded with the first direction as the folding axis, and the second region is defined as an unfolding region, wherein the elastic member includes a first layer, a second layer disposed on the first layer, and a third layer disposed between the first layer and the second layer, wherein the first layer includes a metal, wherein the second layer includes a base material and fibers disposed inside the base material, wherein the fibers provided in the second layer are disposed in the second layer to extend in the second direction, which is a direction perpendicular to the direction in which the folding axis extends and the first direction, wherein the third layer is an adhesive layer disposed between the first layer and the second layer, wherein the first layer includes a first void disposed in the first region of the first layer, and wherein the third layer includes a second void disposed in the first region of the third layer.

2. The elastic member of claim 1, wherein a thickness of the second layer is 15 μm to 200 μm.

3. The elastic member of claim 1, further comprising an alignment mark, wherein the alignment mark is disposed on the surface of the second layer and defines the longitudinal direction of the fibers.

4. The elastic member of claim 1, wherein the first layer further comprises non-metal.

5. The elastic member of claim 1, wherein a diameter of the fibers is 0.0001 mm to 0.01 mm.

6. The elastic member of claim 1, wherein the second layer includes a 1a region corresponding to the first region and a 2a region corresponding to the second region, wherein the fibers are disposed in the 1a region and the 2a region.

7. The elastic member of claim 6, wherein an overlapping region between the fibers and the 1a region is greater than an overlapping region between the fibers and the 2a region.

8. The elastic member of claim 6, wherein an overlapping region between the fibers and the 1a region is smaller than an overlapping region between the fibers and the 2a region.

9. The elastic member of claim 6, wherein a volume % of the fibers with respect to the total area of the 2a region is smaller than the volume % of the fibers with respect to the total area of the 1a region.

10. The elastic member of claim 1, wherein the second layer includes a 1a region corresponding to the first region and a 2a region corresponding to the second region, wherein the fibers are disposed in any one of the 1a region and the 2a region.

11. The elastic member of claim 1, wherein the second layer further comprises fibers that extend tilted with respect to the longitudinal direction of the first layer.

12. The elastic member of claim 1, wherein the first layer includes a first base material and a first fiber, wherein the second layer includes a second base material and a second fiber.

13. The elastic member of claim 12, wherein the first base material and the second base material include different materials, wherein the first fiber and the second fiber include different materials.

14. The elastic member of claim 1, wherein the first void and the second void have different widths.

15. The elastic member of claim 1, wherein a width of the first void is smaller than a width of the second void.

16. A display device comprising:

an elastic member of claim 1;

a protective layer under the elastic member;

an adhesive layer on the elastic member; and a panel layer on the adhesive layer, wherein the panel layer includes at least one of a display panel and a touch panel.

\* \* \* \* \*